(12) United States Patent
Herzig et al.

(10) Patent No.: US 7,022,802 B2
(45) Date of Patent: Apr. 4, 2006

(54) SILICONE OIL PASTES

(75) Inventors: Christian Herzig, Feichten (DE); Siegfried Dormeier, Stubenberg (DE)

(73) Assignee: Wacker-Chemie GmbH, Munich (DE)

( * ) Notice: Subject to any disclaimer, the term of this patent is extended or adjusted under 35 U.S.C. 154(b) by 135 days.

(21) Appl. No.: 10/655,102

(22) Filed: Sep. 4, 2003

(65) Prior Publication Data
US 2004/0048999 A1    Mar. 11, 2004

(30) Foreign Application Priority Data
Sep. 5, 2002 (DE) ................. 102 41 148

(51) Int. Cl.
*C08G 77/458* (2006.01)

(52) U.S. Cl. .......... 528/28; 524/588; 528/44; 528/310; 528/332

(58) Field of Classification Search .......... 528/28, 528/44, 310, 332; 524/588
See application file for complete search history.

(56) References Cited

U.S. PATENT DOCUMENTS

| | | | |
|---|---|---|---|
| 3,879,196 A * | 4/1975 | Nagashima et al. | 430/45 |
| 5,001,210 A | 3/1991 | Coury et al. | |
| 5,221,724 A | 6/1993 | Li et al. | |
| 6,166,093 A | 12/2000 | Mougin et al. | |
| 6,353,076 B1 | 3/2002 | Barr et al. | |
| 2002/0086952 A1 | 7/2002 | Chino et al. | |

FOREIGN PATENT DOCUMENTS

| | | |
|---|---|---|
| DE | 100 46 024 | 4/2001 |
| EP | 0 193 808 A2 | 2/1986 |
| EP | 0 250 248 B1 | 11/1997 |
| EP | 0 870 793 A2 | 4/1998 |
| EP | 0 822 950 B1 | 10/2001 |
| FR | 2708272 | 7/1993 |
| WO | WO 96/34030 | 10/1996 |
| WO | WO 97/40103 | 10/1997 |

OTHER PUBLICATIONS

Hart, "Organic Chemistry A Short Course", 8th Ed., Houghton Mifflin Company, 1991, p. 409.*
English Derwent Abstract AN 1986-239950(37) corresponding to EP 0 193 808.
English Derwent Abstract AN 1995-075206 [10]corresp. to FR 2708272 A1.
English Derwent Abstract AN 2001-433692 [47]corresp. to DE 100 46 024 A1.

* cited by examiner

*Primary Examiner*—Kuo-Liang Peng
(74) *Attorney, Agent, or Firm*—Brooks Kushman P.C.

(57) ABSTRACT

Pastes comprise (1) siloxane copolymers which contain at least two groups of the general formula

—C(O)NR$^1$— in covalently bonded form on average per molecule, where R$^1$ is a hydrogen atom or an alkyl radical having 1 to 18 carbon atoms and (2) organic compound(s) with a melting point greater than 0° C. which are dispersed in the siloxane copolymers (1) and contain at least one group which participates in the formation of hydrogen bridges with the —C(O)NR$^1$ groups in (1). The pastes are useful for numerous purposes, for example as hydrophobicizing compositions.

20 Claims, No Drawings

SILICONE OIL PASTES

BACKGROUND OF THE INVENTION

1. Field of the Invention

The invention relates to pastes which comprise silicone oils.

2. Background Art

WO 97/40103 describes mixtures of silicone oils with silicone-urea copolymers, to which up to 30% of silicate resins are added. The copolymer is constructed from alternate diorganosiloxane and oligourea blocks. The mixtures form thixotropic masses which can be used as adhesives and sealants.

Polyurethanes and polyurethane ureas which comprise up to 30% by weight of silicone resins are described in EP-A 193 808. The formulations form multiphase mixtures which are used for the coating of leather and textiles.

SUMMARY OF THE INVENTION

The present invention provides pastes comprising a polysiloxane copolymer containing at least two —C(O)NR$^1$ groups and an organic compound capable of hydrogen bonding with the polysiloxane copolymer. The pastes may be used for hydrophobicization of polar and non-polar surfaces and for other uses as well.

DETAILED DESCRIPTION OF THE PREFERRED EMBODIMENT(S)

The invention thus provides pastes comprising (1) siloxane copolymers which contain at least two groups of the general formula

—C(O)NR$^1$— in covalently bonded form per molecule, where R$^1$ is a hydrogen atom or an alkyl radical having 1 to 18 carbon atoms, preferably a hydrogen atom and (2) organic compounds with a melting point greater than 0° C. which are dispersed in the siloxane copolymers (1) and contain, per molecule, at least one group which acts as donor and/or acceptor for the formation of hydrogen bonds or "bridges" with the —C(O)NR$^1$ groups in (1).

The siloxane copolymers (1) are preferably liquid at room temperature (25° C.) and have a viscosity of preferably 0.2 Pa·s to 500 Pa·s at 25° C., preferably 1 Pa·s to 50 Pa·s at 25° C., and have a molecular weight (M$_n$) of 500 to 5,000,000 daltons, preferably 1000 1,000,000 daltons, more preferably 5000 to 100,000 daltons.

The organic compounds (2) are preferably solid at room temperature (25° C.) and preferably have a melting point of at least 30° C., more preferably at least 50° C.

The mixtures of siloxane copolymers (1) and organic compounds (2) exhibit characteristics such that above a certain temperature range, which is above 0° C., they form homogeneous oily phases with a viscosity of preferably 0.2 Pa·s to 500,000 Pa·s at 25° C., more preferably 1 Pa·s to 500 Pa·s at 25° C., and below this temperature range are in the form of pasty masses in which the organic compounds (2) are dispersed as solids in the siloxane copolymers (1).

In the pastes according to the invention, the organic compounds (2) act as physical crosslinkers toward the siloxane copolymers (1). The formation of many weak hydrogen bonds between siloxane copolymers (1) and organic compounds (2) results in a physical network. By means of heating it is possible to reversibly destroy these structures, i.e. the silicone copolymers (1) can be reversibly crosslinked by thermal means in a simple manner.

The invention further provides a process for the preparation of the pastes according to the invention by heating a mixture comprising (1) siloxane copolymers which contain at least two groups of the general formula

—C(O)NR$^1$— in covalently bonded form per molecule, and (2) organic compounds with a melting point greater than 0° C. which contain, per molecule, at least one group which acts as donor and/or acceptor for the formation of hydrogen bridges with the —C(O)NR$^1$ groups in the siloxane copolymers (1), until a homogeneous oil is obtained, and then cooling the resulting oil until a paste is obtained.

The organic compounds (2) are preferably contained in the pastes in amounts of 0.02 to 20% by weight, more preferably 0.5 to 3% by weight, based on the total weight of siloxane copolymers (1) and organic compounds (2). The major component is thus the siloxane copolymer (1).

The siloxane segments or siloxane blocks in the siloxane copolymers (1) preferably contain siloxane units of the general formula $$R_a SiO_{\frac{4-a}{2}},$$

where R is a monovalent hydrocarbon radical having 1 to 18 carbon atoms per radical, and a is 0, 1, 2 or 3, preferably 2. R may be the same or different.

The siloxane copolymer (1) preferably comprises at least 50% by weight of diorganosiloxane units, preferably at least 90% by weight of diorganosiloxane units.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radical, such as the ethynyl, propargyl and 1-propynyl radicals; aryl radical, such as the phenyl, naphthyl, anthryl and phenanthryl radicals; alkaryl radical, such as the o-, m-, p-tolyl radicals, xylyl radicals and ethylphenyl radicals; and aralkyl radical, such as the benzyl radical, and the α- and the β-phenylethyl radicals.

Examples of preferred alkyl radicals R$^1$ are the methyl, ethyl, n-propyl, isopropyl, 1-n-butyl, 2-n-butyl, isobutyl, tert-butyl, n-pentyl, isopentyl, neopentyl, and tert-pentyl radicals, and hexyl radicals such as the n-hexyl radical.

The siloxane copolymers (1) may contain the —C(O)NR$^1$ groups in any order and arrangement. The —C(O)NR$^1$ groups are preferably bonded to the siloxane segments via Si—C bonds. The —C(O)NR$^1$ groups can be present individually, blockwise or in series both along the main chain and also in side chains. The siloxane copolymers (1) may have linear, branched or cyclic structures or else mixtures of such structures.

The —C(O)NR$^1$ groups are preferably not bonded directly to silicon atoms. They can be bonded on both sides to C atoms, as a result of which they receive the meaning of amide groups C—C(O)NR$^1$—C. In a further embodiment according to the invention, the —C(O)NR$^1$ groups can be bonded on one side also to heteroatoms, resulting in the following types of structure:

| | |
|---|---|
| O—C(O)NR$^1$—C | urethane |
| N—C(O)NR$^1$—C | urea |
| O—C(O)NR$^1$—C(O)NR$^1$—C | allophanate |
| NR$^1$—C(O)NR$^1$—C(O)NR$^1$—C | biuret | and higher condensates. Such more complex forms of —C(O)NR$^1$ groups may have a linear structure or be part of a branch and/or a ring system. They are to be regarded as examples and do not represent any limitation of the scope of the invention.

The siloxane copolymers (1) can contain a single type of —C(O)NR$^1$ groups or two or more types thereof. Thus, for example, urethane and urea groups may be present simultaneously.

The siloxane copolymers (1) contain minimally one siloxane block, as, for example, in the case of a linear polysiloxane which bears monofunctional groups which each contain at least one —C(O)NR$^1$ group on the ends of the chains. However, preference is given to siloxane copolymers (1) which contain these groups a number of times in the average molecule.

Examples of siloxane copolymers (1) and the preparation thereof are described in EP-B 250 248, WO 1996/034030, EP-B 822 950, U.S. Pat. No. 5,221,724, U.S. Pat. No. 5,001,210, and U.S. Pat. No. 6,166,093.

For example, the siloxane copolymers (1) may be prepared by reacting a polyorganosiloxane having terminal Si—C bonded hydroxyl or amino groups, preferably a linear polydiorganosiloxane having terminal Si—C bonded hydroxyl or amino groups, with mono-, di-, or triisocyanates, preferably diisocyanates. In this process, urethane-siloxane copolymers or urea-siloxane copolymers are respectively obtained.

Preferred siloxane copolymers (1) are therefore those which contain structural units of the general formula —SiR$_2$O(SiR$_2$O)$_n$[OR$_2$Si—R$^3$—O—C(O)—NH—
R$^2$—NH—C(O)—O—R$^3$—SiR$_2$O(SiR$_2$O)$_n$]$_x$OR$_2$Si— or

—SiR$_2$O(SiR$_2$O)$_n$[OR$_2$Si—R$^3$—NH—C(O)—NH—
R$^2$—NH—C(O)—NH—R$^3$—SiR$_2$O(SiR$_2$O)$_n$]$_x$OR$_2$Si— where
R has the meaning given previously, where
R$^2$ is a divalent hydrocarbon radical, preferably an alkylene radical, having 2 to 36 carbon atoms,
R is a divalent hydrocarbon radical which can contain one or more heteroatoms, such as one or more non-adjacent oxygen or nitrogen atoms, preferably an alkylene radical having 1 to 12 carbon atoms,
n is 0 or an integer from 1 to 1000 and
x is 0 or an integer from 1 to 100.

If, for example, in the preparation of the siloxane copolymer (1), the mono-, di- or triisocyanates are used in stoichiometric deficit, the siloxane copolymers (1) preferably contain, as end groups, siloxane units with Si—C bonded hydroxyl or amino groups, preferably those of the formula —R$^3$—OH or —R$^3$—NH$_2$, where R$^3$ has the meaning given previously.

If, for example, in the preparation of the siloxane copolymer (1), the mono-, di- or triisocyanates are used in stoichiometric excess, the siloxane copolymers (1) preferably contain, as end groups, siloxane units with Si—C bonded isocyanato groups, preferably those of the formula —R$^3$—O—C(O)—NH—R$^2$—N=C=O or —R$^3$—
NH—C(O)—NH—R$^2$—N=C=O, where R$^2$ and R$^3$ have the meanings given above for them.

Preferably, therefore, the —C(O)NR$^1$ groups are present in structural units of the general formula —O—C(O)—NH—R$^2$—NH—C(O)—O— or
—NH—C(O)—NH—R$^2$—NH—C(O)—NH— and/or

—R$^3$—O—C(O)—NH—R$^2$—N=C=O or —R$^3$—
NH—C(O)—NH—R$^2$—N=C=O where R$^2$ has the meaning previously given.
Examples of radicals R$^2$ are —(CH$_2$)$_2$—, —(CH$_2$)$_4$—, —(CH$_2$)$_6$—, —(CH$_2$)$_8$—, Examples of radicals R$^3$ are —CH$_2$—, —(CH$_2$)$_2$—, —(CH$_2$)$_3$—, —CH(CH$_3$)CH$_2$—(CH$_2$)$_2$C(CH$_3$)$_2$—, —(CH$_2$)$_3$O(CH$_2$)$_2$—, —(CH$_2$)$_3$O(C$_2$H$_2$H$_4$O)$_4$—, —(CH$_2$)$_3$O(C$_3$H$_6$O)$_{10}$—, —(CH$_2$)$_3$O(C$_2$H$_4$O)$_{20}$(C$_3$H$_6$O)$_{10}$—, and —(CH$_2$)$_3$NHCO$_2$(CH$_2$)$_2$O—

The pastes according to the invention can contain one type of siloxane copolymers (1) or different types of siloxane copolymers (1).

The compounds (2) are preferably organic molecules with a significantly lower molar mass than that of the siloxane copolymers (1). They are preferably discrete compounds which readily crystallize and contain, per molecule, 1 to 8 active centers, more preferably 1 to 4, and most preferably 1 or 2 active centers. Active centers with regard to the present invention are generally those substructures which are able to form hydrogen bridges by functioning either as an acceptor (2a) or as a donor (2b), or simultaneously as donor and acceptor (2c).

Preferred groups which act as acceptor groups (2a) are those which contain atoms with free available electron pairs. Examples thereof are:

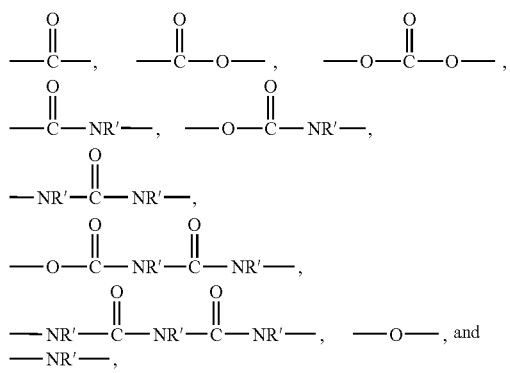

where R is an alkyl radical having 1 to 18 carbon atoms.

Preferred groups which act as donor groups (2b) are those which contain hydrogen bonded to heteroatoms, such as N—H, O—H or S—H. Examples are therefore primary and secondary amines, alcohols, phenols or mercaptans.

Particular preference is given to combinations of acceptor and donor groups (2c).

Examples thereof are as follows, wherein R is a monovalent hydrocarbon radical having 1 to 18 carbon atoms per radical, as previously defined:

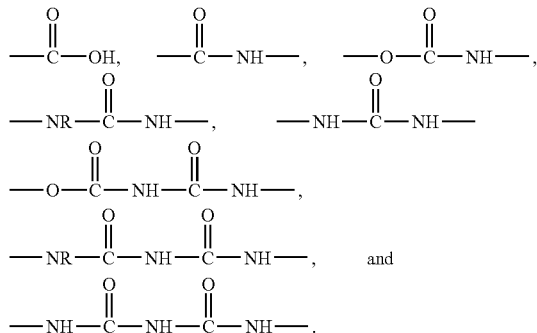

Compounds (2) with melting points below 0° C. do not produce pastes, but only flowable viscous oils above 0° C. In order for pastes to form, the melting points of the compounds (2) must be above the temperature range in which the mixture which comprises (1) and (2) should be present in pasty form. For practical reasons, a temperature difference of preferably more than 5° C., preferably more than 10° C., is advantageous. For example, if it is desirable that a mixture comprising (1) and (2), which is in the form of a homogeneous oil at elevated temperature, exist as a paste below 50° C., the melting point of the compound (2) is advantageously at least 60° C. or higher.

Preferably, the compounds (2) have a molecular weight ($M_n$) of up to 1000 daltons, preferably of up to 500 daltons.

Examples of preferred compounds (2) are diurethanes, for example reaction products of hexamethylene 1,6-diisocyanate with alcohols such as methanol (105° C.), ethanol (75° C.), n-butanol (90° C.), n-amyl alcohol (92° C.), n-hexanol (95° C.) and n-dodecanol (113° C.); diureas, for example reaction products of hexamethylene 1,6-diisocyanate with amines such as n-octylamine (180° C.) and tert-octylamine (75° C.). The brackets in each case give the melting points of the corresponding compound (2).

Further preferred compounds (2) are diurethanes which are reaction products of stearyl isocyanate with diols such as 1,3-propanediol (105° C.), 1,3-butanediol (86° C.) or 1,4-butanediol (114° C.), and also diureas which are reaction products of stearyl isocyanate with diamines such as 1,3-diaminoneopentane (77° C.). In brackets in each case are given the melting points of the corresponding compound (2).

Surprisingly, pastes are also obtained with compounds (2) when they contain only one active center per molecule. These substances should actually not be suitable for forming physical networks: N-stearylurea, prepared from stearyl isocyanate and ammonia, and with a melting point of 101° C., is one example of such a compound.

The pastes according to the invention can contain one type of compound (2) or various types of compound (2).

A particularly simple type of preparation of the pastes according to the invention is the addition of compound (2) to the heated siloxane copolymer (1), where the temperature of the heated siloxane copolymer (1) is above the melting point of the compound (2), resulting in a homogeneous "solution" of (2) in (1). The pastes according to the invention are then obtained upon cooling.

Preferably, the mixture of siloxane copolymer (1) and compound (2) is heated to 50° C. to 200° C., preferably to 80° C. to 200° C.

The pastes according to the invention are obtained upon cooling the mixtures, preferably to less than 40° C., and more preferably to less than 60° C.

The pastes according to the invention are preferably slide-resistant at 25° C. The paste is slide-resistant if the paste is applied to a vertical flat support in an application thickness of 1 mm using a knife, a brush or by spraying, and this paste does not run down by more than 0.1 cm following application.

Another type of embodiment is the generation of compounds (2) during or directly after the preparation of the siloxane copolymers (1). In this embodiment, organic compound (2) is formed in situ in the presence of the heated siloxane copolymer (1), where the temperature of the heated siloxane copolymer (1) is above the melting point of the organic compound (2) formed in situ, and the resulting homogeneous oil is then cooled, resulting in a paste.

If the siloxane copolymers (1) are prepared, for example, from α,ω-di(aminopropyl)polydimethylsiloxane with a diisocyanate in excess, then the excess of the diisocyanate can be used in order to generate compound (2) in situ by adding alcohol or amine. It is, however, also possible to mix together and react all of the components which are required for the preparation of (1) and (2). Advantageously, the reaction is carried out at elevated temperature to completion, preferably at a temperature of from 40° C. to 140° C., more preferably at a temperature of from 70° C. to 120° C.

The pastes are usually prepared in neat form so that they are produced directly upon cooling. High polymer viscosities, however, may necessitate the use of organic solvents in order to be able to carry out the preparation process. Suitable organic solvents are, in particular, alcohols, esters and ketones, i.e. small molecules which are able as donor or acceptor to form just one hydrogen bridge. Substances which can form two or more hydrogen bridges are in principle also suitable, but are not as efficient in reducing the system viscosity.

These solvents can be used in any amount. The pastes can therefore comprise organic solvents in amounts preferably from 0.01 to 20% by weight based on the total weight of siloxane copolymer (1) and compound (2). The solvents can be left in the composition or can be removed, all or in part. Alcohols in particular occasionally prevent the formation of pasty structures, but this can be remedied by evaporation of the alcohol solvent.

The pastes according to the invention can be used for the hydrophobicization of polar and nonpolar surfaces. They can be used for the care of leather, imitation leather and other plastic coatings and exhibit good spreading and adhesion behavior on most substrates. The pastes according to the invention are suitable for the preparation of creams in the cosmetics and hygiene sector, which may also comprise greater or lesser amounts of water.

EXAMPLES

Example 1

2000 g of an α, ω-bis(3,3-dimethyl-3-hydroxy-propyl) polydimethylsiloxane with a degree of polymerization of 50 siloxy units per average chain (1049 meq. tert OH) are mixed with 75 g of hexamethylene 1,6-diisocyanate (HDI) and catalyzed by adding 40 mg of dibutyltindilaurate (DBTL) and 2.1 g of diazabicyclooctane. At 130° C., the viscosity of the mixture increases over the course of 5 hours from 85 to 5270 mm$^2$/s at 25° C., and yields an OH-terminated siloxane-urethane-segmented copolymer with an average molar mass of $M_n$=26,300 daltons and about 12 urethane groups per average molecule. The polymer is clear, freely flowable and contains no isocyanate.

Example 2

At 110° C., 2% by weight of a diurethane (melting point 105° C.), prepared from stearyl isocyanate and 1,3-propanediol in a molar ratio of 2:1, are dissolved in the siloxane copolymer obtained of Example 1 to give a clear solution. Upon cooling, the mixture solidifies at 95° C. to give a whitish paste which is stiff at 25° C.

Example 3

Example 2 is repeated using 2% by weight of a diurethane (melting point 90° C.) prepared from hexamethylene diisocyanate and n-butanol in a molar ratio of 1:2. Upon cooling, the transition from the clear, homogeneous oil phase to the whitish slide-resistant paste takes place at about 70° C. By doubling the amount of diurethane to 4% by weight, this transition is shifted to about 80° C.: a stiffer paste results. By halving the diurethane addition to 1% by weight, a very soft paste forms upon cooling from about 60° C. which is just still slide-resistant.

Example 4

Hexamethylene diisocyanate and tert-octylamine in a molar ratio of 1:2 are used to prepare a diurea with a melting point of 75° C. Dissolving 1% by weight of this compound at 100° C. in the siloxane-urethane copolymer of Example 1 followed by cooling the clear oil gives, at 25° C., a slide-resistant paste with somewhat sticky properties even using this small amount of additive.

Example 5

In contrast to Example 4, a paste is prepared from stearylurea (melting point 101° C.), a monourea which thus contains only one H-bridge-forming function per molecule, by dissolving 2% by weight of stearylurea at 101° C. in the siloxane-urethane copolymer of Example 1. Nevertheless, upon cooling the oily solution, a stiff, white paste is obtained at about 90° C.

Example 6

500 g of an α,ω-bis(3,3-dimethyl-3-hydroxypropyl)-polydimethylsiloxane are heated with 44 g of hexamethylene diisocyanate and 10 mg of dibutyltin dilaurate for 3 hours at 100° C., during which the viscosity increases greatly. Subsequently, residual hexamethylene diisocyanate is reacted with methanol at 70° C. over the course of a further 3 hours. Upon cooling, the transition from the homogeneous oil phase to the soft, but slide-resistant, paste, which still comprises excess methanol, takes place at about 60° C.

Example 7

Example 6 is repeated except that residual hexamethylene diisocyanate is reacted with 20 g of n-butanol over the course of 3 hours at 100° C. until hexamethylene diisocyanate can no longer be detected in the IR spectrum. Upon cooling, a soft paste is likewise obtained at about 60° C., and no longer contains solvent. Siloxane copolymer (1) and compound (2) are produced successively in a one-pot reaction. Compound (2) therefore does not first have to be prepared separately as pure material.

Example 8

As a modification to Example 6, only 33 g of hexamethylene diisocyanate are used, i.e. using a smaller diisocyanate excess, and a more viscous α,ω-isocyanatosiloxane-urethane copolymer is produced. After 3 hours at 100° C., a further 11 g of hexamethylene diisocyanate are added at 100° C., followed by 20 g of n-butanol. The formation of the dibutyldiurethane and the butoxylation of the isocyanato chain ends starts immediately with exothermy. After a further 3 hours, the mixture is cooled, a white, stiff paste already forming at 72° C. The paste can be reconverted into a clear oil by heating to 80° C. and can be regenerated by cooling to 72° C.

Example 9

How the chain length of the alcohol used and thus the structure of the diurethane influences the phase transition range from oil to paste becomes clear when Example 7 is carried out using 50 g of 1-dodecanol instead of 20 g of n-butanol. Upon cooling from 100° C., a white, stiff paste arises at just 95° C.

Example 10

Example 6 is repeated except that the reaction mixture, following complete conversion of the α,ω-bis(3,3-dimethyl-3-hydroxypropyl)-polydimethylsiloxane, is admixed with 34 g of n-octylamine instead of methanol. The temperature increases to 120° C., where the oil phase converts more and more to a paste-like consistency. After one hour, the mixture is cooled to 25° C. A very stiff, colorless paste is formed.

Example 11

The viscosity of the α,ω-isocyanatosiloxane-urethane copolymer prepared in Example 8 can be increased further by reducing the isocyanate excess to 29 g of hexamethylene diisocyanate. After 3 hours at 100° C., a further 1.8 g of hexamethylene diisocyanate and then 13.2 g of n-octylamine are metered in. An exothermic reaction takes place with a temperature increase to 107° C. and the formation of a paste-like consistency. After 1 hour at 100° C., the system is cooled. This gives a less stiff, colorless, virtually transparent paste.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A paste comprising
   (1) at least one siloxane copolymer which contains at least two groups of the formula

in covalently bonded form on average per molecule, which are liquid at 25° C., and which have a number average molecular weight $M_n$ from 500 to 5,000,000 daltons, where $R^1$ is a hydrogen atom or an alkyl radical having 1 to 18 carbon atoms; and
   (2) at least one organic compound which is a solid at 25° C. and has a molecular weight $M_n$ of up to 1000 daltons, dispersed in the siloxane copolymers (1), wherein said at least one organic compound contains at least one group which participates in the formation of hydrogen bridges with the —C(O)NR$^1$— groups in (1).

2. The paste of claim 1, wherein the siloxane copolymers (1) are liquid at 25° C. and have a molecular weight ($M_e$) of from 5,000 to 100,000 daltons.

3. The paste of claim 1, wherein the organic compounds (2) are solid at 30° C. and have a molecular weight ($M_n$) of up to 500 daltons.

4. The paste of claim 1, wherein the organic compounds (2) are solid at 50° C.

5. The paste of claim 1, wherein the organic compound(s)(2) are present in the paste in amounts of from 0.02 to 20% by weight, based on the total weight of siloxane copolymers (1) and organic compound(s)(2).

6. The paste of claim 1, wherein a siloxane copolymer (1) contains siloxane units of the formula

where R is a monovalent hydrocarbon radical having 1 to 18 carbon atoms per radical and a is 0, 1, 2 or 3.

7. The paste of claim 1, wherein the siloxane copolymers (1) are the reaction products of polydiorganosiloxanes having terminal Si—C bonded hydroxyl and/or amino groups with less than a stoichiometric amount of one or more diisocyanates, where urethane-siloxane copolymers and/or urea-siloxane copolymers with terminal Si—C bonded hydroxyl or amino groups are obtained.

8. The paste of claim 1, wherein the siloxane copolymers (1) are the reaction products of polydiorganosiloxanes having terminal Si—C bonded hydroxyl and/or amino groups with a stoichiometric of one or more excess diisocyanates, where urethane-siloxane copolymers and/or urea-siloxane copolymers with terminal Si—C bonded isocyanato groups are obtained.

9. The paste of claim 1, wherein the organic compound (2) used comprise diurethanes or diureas.

10. The paste of claim 1, wherein said groups of the formula

are selected from the group consisting of amide, urea, urethane, allophanate, biuret, and mixtures thereof.

11. The paste of claim 1, further comprising an organic solvent.

12. A process for the preparation of a paste of claim 1, comprising heating a mixture comprising
   (1) siloxane copolymers which contain at least two groups of the general formula

in covalently bonded form on average per molecule, where $R^1$ is a hydrogen atom or an alkyl radical having 1 to 18 carbon atoms and (2) organic compounds with a melting point greater than 0° C. which contain at least one group which participates in the formation of hydrogen bridges with the —C(O)NR$^1$— groups in the siloxane copolymers (1), until a homogeneous oil is obtained, and then cooling the resulting oil until a paste is obtained.

13. The process of claim 12, wherein the organic compound (2) is added to the heated siloxane copolymer (1), where the temperature of the heated siloxane copolymer (1) is above the melting point of the organic compound (2), and the resulting homogeneous oil is then cooled, giving a paste.

14. The paste of claim 1, wherein said organic compound(s)(2) contain at least one group selected from the group consisting of

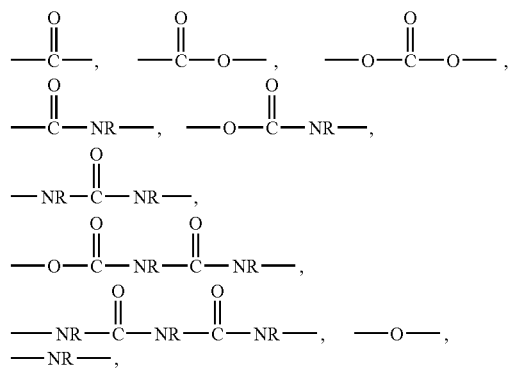

wherein R is a hydrocarbon radical containing 1 to 18 carbon atoms.

15. A paste comprising
(1) at least one siloxane copolymer which contains at least two groups of the formula

—C(O)NR$^1$— in covalently bonded form on average per molecule, where R$^1$ is a hydrogen atom or an alkyl radical having 1 to 18 carbon atoms; and
(2) at least one organic compound with a melting point greater than 0° C., dispersed in the siloxane copolymers (1), said compound comprising a diurethane, a diurea, or mixture thereof.

16. A paste, comprising
(1) at least one linear organopolysiloxane copolymer containing at least two groups of the formula

—C(O)NR$^1$— covalently bonded a) within the linear organopolysiloxane copolymer chain, b) at the termini thereof, or bonded as described in both a) and b), said copolymer being a liquid at 25° C., where R$^1$ is a hydrogen atom or an alkyl radical having 1 to 18 carbon atoms; and
(2) at least one compound having a molecular weight $M_n$ of up to 1000 daltons and having at least one group which participates in the formation of hydrogen bridges with —C(O)NR$^1$— groups of (1), dispersed in (1).

17. The paste of claim 16, wherein said linear organopolysiloxane copolymer has a molecular weight $M_n$ of between 500 and 5,000,000 daltons.

18. The paste of claim 16, which is an ingredient in a cosmetic formulation further comprising an organic solvent, water, or both organic solvent and water.

19. The paste of claim 16, wherein said at least one organic compound (2) has a melting point of 30° C. or more.

20. The paste of claim 16, wherein said at least one organic compound (2) has a melting point of 50° C. or more.

* * * * *